United States Patent [19]

Holtzman et al.

[11] 4,213,116

[45] Jul. 15, 1980

[54] VEHICLE TURN DETECTION APPARATUS

[76] Inventors: Norman Holtzman, 3142 Barry Ave., Los Angeles, Calif. 90066; Robert J. Hromadka, 1301 Brockton Ave., Los Angeles, Calif. 90025; Herbert H. Halperin, 13909 Riverside Dr., Sherman Oaks, Calif. 91403

[21] Appl. No.: 5,085

[22] Filed: Jan. 22, 1979

[51] Int. Cl.² ............................................... B60Q 1/34
[52] U.S. Cl. ....................................... 340/73; 340/56; 200/52 A; 200/61.45 R
[58] Field of Search ............... 340/52 R, 52 D, 52 H, 340/53, 56, 73, 74; 200/52 A, 61.45 R, 61.52

[56] References Cited

U.S. PATENT DOCUMENTS 4,030,066  6/1977  White ....................................... 340/56

Primary Examiner—Alvin H. Waring

[57] ABSTRACT

An electrical translation circuit for detecting the initiation and termination of a lane change or turn of a motorcycle, automobile, boat or other like vehicle. A linear acceleration sensor detects the lateral movement of a vehicle commencing a lane change or turn and produces a signal responsive to same. The output of the sensor assembly is translated into a detectable signal and input as a reset signal to memory units which have stored an electrical signal equivalent to the manually selected direction of the turn. An appropriate change in signal level from the sensor assembly is processed to eliminate a response to false turn indications. Upon the completion of the turn or lane change, the memory unit indicating the direction of change will be reset terminating the illumination of the vehicle's directional signal.

11 Claims, 4 Drawing Figures

VEHICLE TURN DETECTION APPARATUS

BACKGROUND OF THE INVENTION

1. Field of the Invention

The present invention generally relates to vehicle control circuits, and more particularly to apparatus for controlling the termination of directional turn signals.

2. Prior Art

With the increased mobility of the world's population due to vehicular travel, it has become more and more evident that advances are necessary to provide for improved vehicle safety features. In particular, the need to provide improved directional signal control apparatus for vehicles in general, and motorcycles specifically, is of prime importance. Although the present invention is applicable to automobiles, boats and like vehicles which employ rotating steering columns which can easily employ directional signal shafts, the present invention will be discussed in terms of its primary application for motor driven cycles which shall be understood to include motorcycles, mopeds, etc. The latter type of vehicles are unique in the sense that there is no full rotation of the steering mechanism to execute a lane change or turn, but to the contrary, such changes in directions are often, if not always, accomplished through the use of weight allocation. The result of the change in weight allocation will cause a deflection of the motor driven cycle from its quiescent vertical orientation with very little movement of the handle bars or other like steering apparatus.

The prior art discloses several rudamentary types of devices which are used to control the duration of the directional signal used on motor driven cycles. The simplest of these devices is merely a manual switch operated by the user to indicate the start and stop of a left or right hand lane change or turn. Another type of device disclosed by the prior art is based on time and distance. The operator of the motor driven cycle initiates a manual switch to start the directional flashers. Detectors which combine input signals based on time and distance will reset the directional signal irrespective of the dynamics of the operation of the motor driven cycle.

The inadequacies of the above devices are obvious. The elementary manual switch is clearly deficient since the operator may totally neglect to reset the switch after he has completed the lane change or turn. With respect to the circuit based on time and distance, since there is no input which is based on the actual dynamics of the cycle, the directional signals can be reset even though the operator has not completed and possibly not even started the lane change or turn.

The present invention substantially resolves the problems which are inherent in those devices disclosed in the prior art. A sensor assembly detects the lateral change in direction of the motor driven cycle and translates same into an electrical signal responsive to same. The output signal from the sensor assembly is integrated to desensitize the present invention to ignore false or unintentional turning movements. The processed signal is used to reset storage media which have been previously set responsive to a manual switching circuit activated by the user to indicate a left or right lane change or turn. When the sensor assembly detects the completion of a lane change or turn, the directional lights, which are flashing in response to the manual operation of the user, are reset without any action by the user and in full response to the turning dynamics of the motor driven cycle.

SUMMARY OF THE INVENTION

The present invention comprises a vehicle turn detection apparatus which is responsive to the dynamics of a vehicle in general, and a motor driven cycle in particular. As stated previously, a change of direction of a motor driven cycle is made by a shift in weight allocation. There is little movement of the steering apparatus for the cycle thereby precluding use of the conventional type of directional controls used on automobiles, trucks or other vehicles using fully rotating steering columns. Although the present invention can be used on vehicles employing steering columns, the following discussion shall refer to use of the present invention in connection with motor driven cycles. A sensor assembly in the form of a linear motion accelerometer is laterally mounted perpendicular to the general orientation of the motorcycle when it is in motion. The linear motion accelerometer will detect lateral movements of the cycle to either side of its straight path by monitoring the rate of change of the velocity in that lateral direction. The accelerometer outputs a signal responsive to the directional change, the signal being processed by the network to negate any false or inadvertent lateral movements of the cycle while in preparation or at the initiation of a full turn or lane change.

As stated hereinabove, the present invention is to be used to control the reset function of the directional signals of the cycle in response to the dynamics of the cycle as opposed to inflexible parameters of time and distance. Memory storage units, having been previously set into a condition which reflect the user's anticipated turning direction, monitor the output of the translated sensor output. When an appropriate signal from the sensor assembly is received by the latched memory storage unit, the previously set storage unit will be reset. By resetting the storage unit which has been responsive to the selected direction of the turn, the cycle's flashing signals will be turned off.

It is therefore an object of the present invention to provide an improved vehicle turn detection apparatus.

It is another object of the present invention to provide a vehicle turn detection apparatus which is fully responsive to the dynamics of a moving vehicle.

It is yet another advantage of the present invention to provide a vehicle turn detection apparatus which will cancel an erroneous direction selection.

It is still another object of the present invention to provide a vehicle turn detection apparatus which operates independent of the time and distance traveled by a vehicle.

It is still yet another object of the present invention to provide a vehicle turn detection apparatus which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
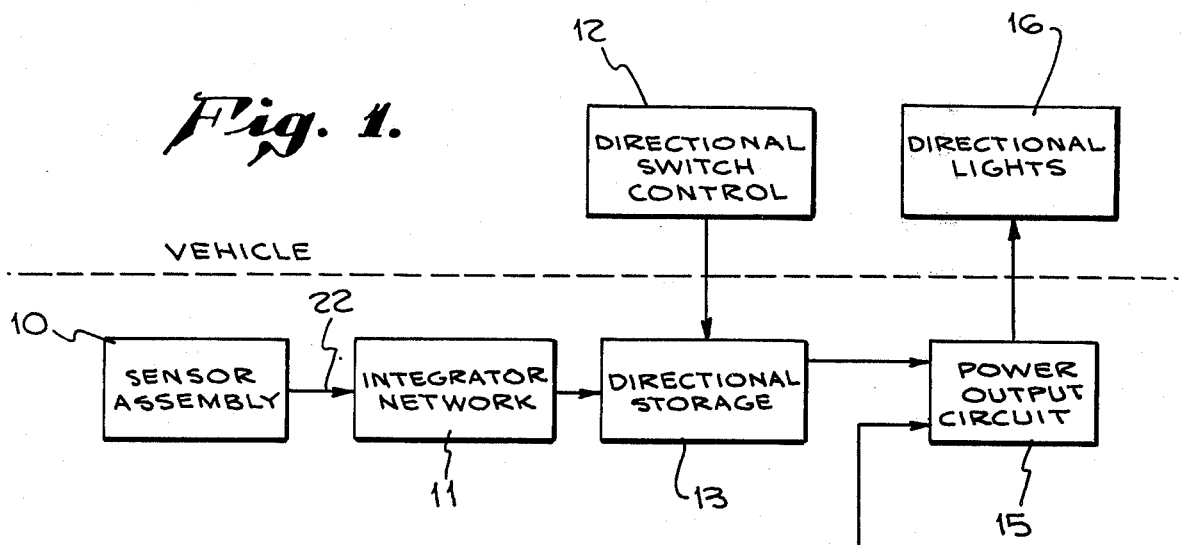
FIG. 1 is a schematic, block diagram of the present invention vehicle turn detection apparatus.

The present invention comprises a vehicle turn detection apparatus responsive to the dynamics of a motor driven cycle. A better understanding of the present invention can be gained by reference to FIG. 1 wherein a schematic, block diagram of the present invention and its interface to a vehicle can be best seen. As stated, the discussion of the present invention is related to a motor driven cycle although it is equally applicable to vehicles employing fully rotational steering columns. Sensor assembly 10 detects the lateral change in direction of the motor driven cycle. A preferred form of the present invention utilizes a linear motion accelerometer for the implementation of sensor assembly 10. When using a linear motion accelerometer, the rate of change of the velocity in the monitored direction will result in a signal responsive thereto. As will be discussed in detail hereinbelow, although the preferred form of the present invention utilizes a pair of mercury switches to implement sensor assembly 10, other conventional linear motion accelerometers employing gyroscopes, pendulums, moving slugs, magnets, etc., could be utilized.

Sensor assembly 10 outputs a signal responsive to the lateral change of direction of the cycle. The output signal of sensor assembly 10 is translated by integrator network 11 which sensitizes the remainder of the system to true changes in direction as opposed to inadvertent movements which were unintentional. As stated hereinabove, the user of the cycle had previously utilized directional switch control 12 to indicate the desired lane change or turn of the cycle. Typical directional switches used on motor driven cycles are momentary switches which produce a signal responsive to the switch activation. Directional storage 13 provides memory to store the user's selection of directional change. The state of directional storage 13 will be maintained until the output of integrator network 11 outputs a signal responsive to the termination of the selected lane change or turn. Timing control 14 produces an electrical output signal which will produce an electrical signal having an alternating duty cycle which will determine the rate at which the cycle's directional lights will flash. When directional storage 13 has been activated to indicate a selected lane change or turn, power output circuits 15 will electrically drive right and left directional lights 16 at a rate set by timing control 14.

Figure 2:
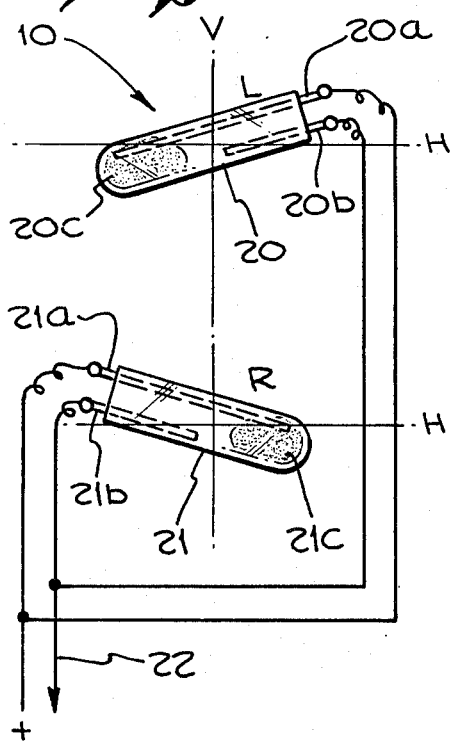
FIG. 2 is a schematic view of the preferred form of the sensor assembly mounted in relationship to the vertical and horizontal orientation of a motor driven cycle.

The preferred form of the implementation of the sensor assembly 10 is shown in FIG. 2. As stated previously, the present invention is particularly applicable for use with motor driven cycles which are deflected from a vertical plane during turns or lane changes. The schematic depiction of sensor assembly 10 as shown in FIG. 2 utilizes a pair of conventional mercury switches 20 and 21. The vertical and horizontal axis of the cycle are schematically designated respectively by the letters V and H. As will be described hereinbelow, mercury switch 20 will detect movement of the cycle to the left, mercury switch 21 detecting a turn to the right. Mercury switch 20 employs a pair of contacts 20a and 20b, the quiescent state of which is a normally open condition. It is understood that mercury switch 20 could be utilized with contacts in a normally closed state, the selection merely one of choice. By definition, the normally open state of mercury switch 20 occurs when there is no electrical continuity between contacts 20a and 20b. A mass of mercury 20c will be used to make electrical contact between contacts 20a and 20b upon the occurrence of appropriate conditions. When there is a rate of change of the velocity of the cycle corresponding to a deflection to the left, the mass of mercury 20c will move to the right responsive to the detected acceleration. In operation, mercury switch 20 is deflected from a horizontal plane by an angle which will depend on the dynamics of the vehicle. Deflection of 10° is approximately equal to a force of one-tenth the force of gravity. The deflection of mercury switch 20 is used to avoid the effect of spurious or unwanted closures of contacts 20a and 20b. In a preferred embodiment of the present invention, mercury switch 20 is deflected from a horizontal plane at an angle in the range of 0°-15°.

Mercury switch 21 operates identically to mercury switch 20. Contacts 21a and 21b will be in a normally open condition in the quiescent state. When mercury mass 21c creates electrical continuity between contacts 21a and 21b as a result of a change of velocity, the contacts will appear closed and produce a responsive signal on the line designated by the reference numeral 22. The deflection of mercury switch 21 from a horizontal plane follows the same conditions as described in connection with mercury switch 20. As shown in FIG. 2, mercury switches 20 and 21 are connected in parallel so that the closure of either set of contacts will produce a "high" signal on signal line 22 which is input to integrator network 11.

Figure 4:
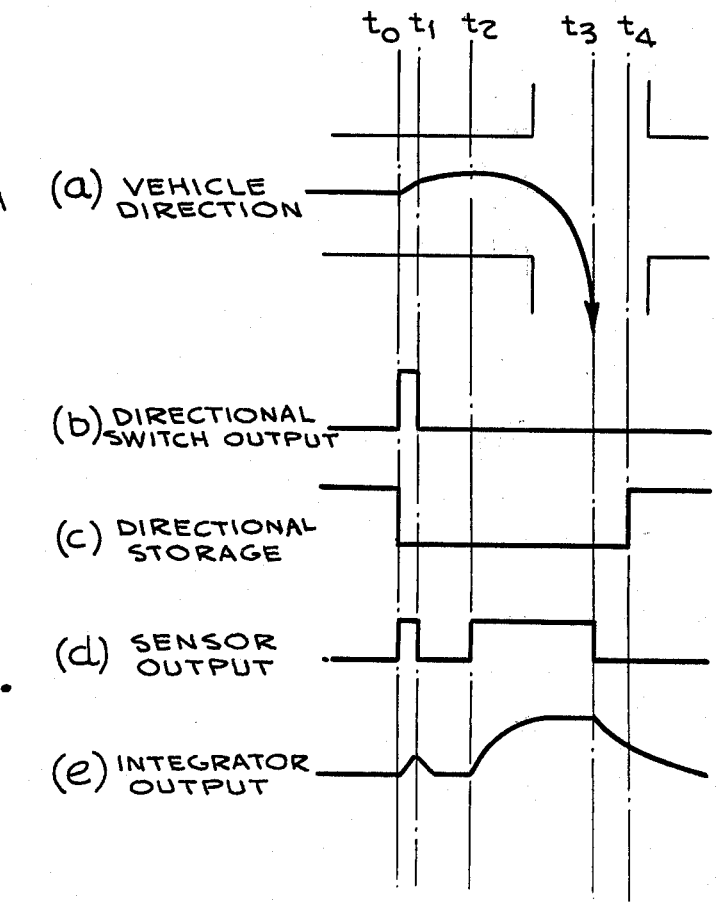
FIG. 4 is a timing diagram of a portion of the elements of the circuits shown in FIG. 3 in relationship to the direction of a moving vehicle.

The operation of the present invention can be best understood by reference to trace (a) shown in FIG. 4. The ultimate direction of the motorcycle is shown to the right with four pertinent time occurrences which are related to the dynamics of the cycle. In the operation of a motor driven cycle, the operator will, in substantially all cases, make a countermovement of the cycle prior to making the actual lane change or turn. As can be seen in trace (a) of FIG. 4, the interval between $t_0$ and $t_1$ constitutes a false turn which occurs only as a result of the balancing movement employed by the user. As will be described hereinbelow, the countering weight movement shown in trace (a) of FIG. 4 will produce a signal of short duration which will be ignored as a control signal by directional storage 13 as a result of integrator network 11. The right turn which is reflected by trace (a) of FIG. 4 commences at time $t_2$ and terminates at time $t_3$. The discussion with respect to circuit shown in FIG. 3 as well as traces (b)-(e), inclusive, will reflect the dynamics of the cycle from $t_0$ through $t_4$.

Figure 3:
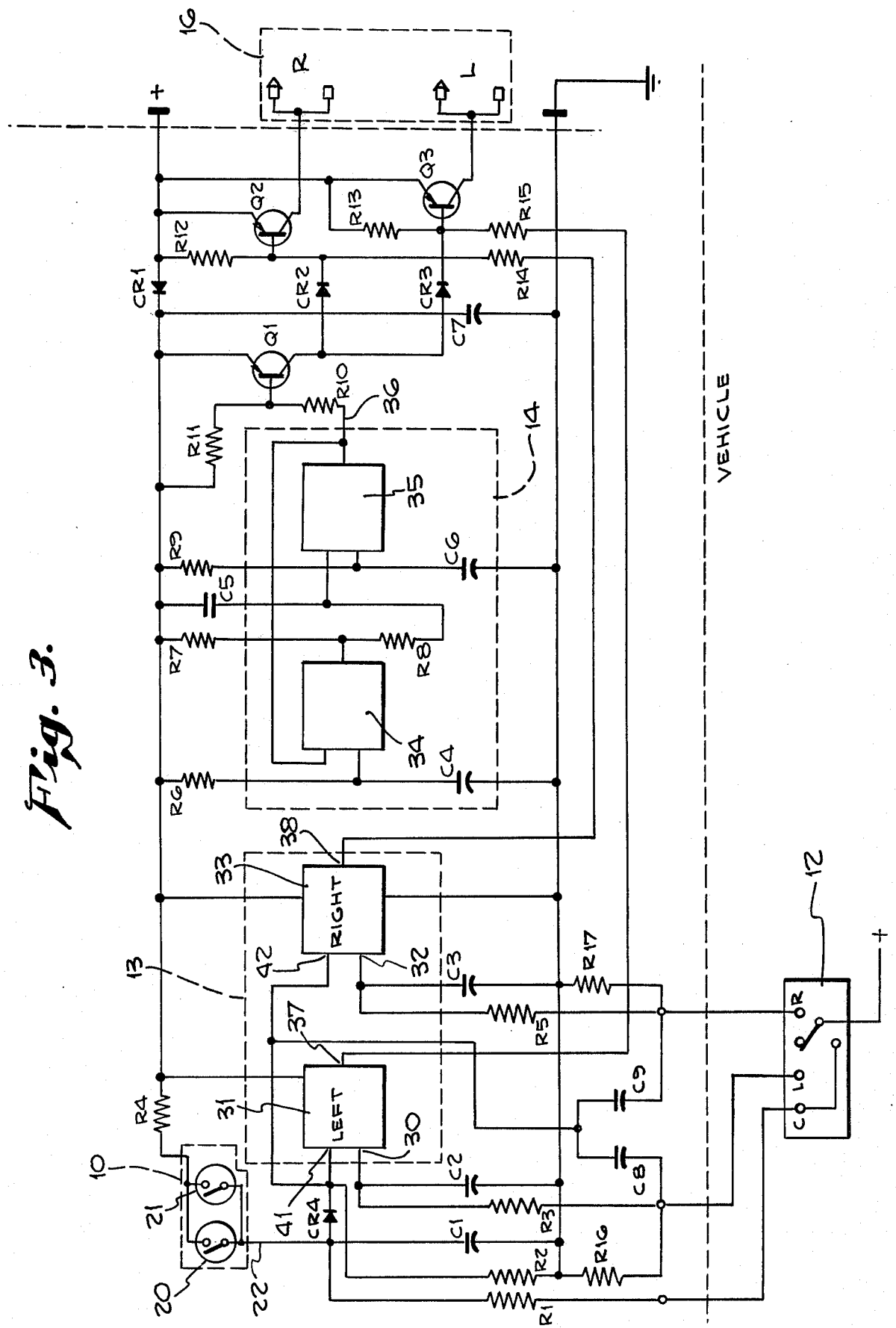
FIG. 3 is a schematic, circuit diagram of the present invention vehicle turn detection apparatus.

Referring now to FIG. 3, a schematic of the present invention and its coupling to the directional switch control 12 and directional lights 16 can be best seen. Directional switch control 12 employs a conventional momentary switch used with motorcycles which will output a signal responsive to a manually selected position or for a clear of a previously set position. Contact L of switch control 12 is connected to set input 30 of latching memory unit 31 using resistor R3 and capacitor C2 as the biasing network. In a like manner, contact R of directional switch control 12 is connected to set input 32 of latching memory unit 33 through signal biasing resistor R5 and capacitor C3. Contact C of switch control 12 is connected to reset inputs 41 and 42 of memory unit 31 and 32 respectively through diode CR4 and resistor R1. CR4 isolates capacitor C1 from the remainder of the circuit used to cancel previously selected direction information. Contact C is used to permit the user to manually reset a previously selected direction. As described hereinabove, the operator of the cycle will manually activate directional switch 12 to set memory latch 31 or 33 respectively, to commence the flashing of a directional light 16. Circuit elements 34 and 35 and the related inner-connecting elements shown comprise an astable multivibrator which is well known in the art. Although the preferred form of the present invention uses an astable multivibrator to implement timing control 14, other conventional alternatives can be used to generate the required periodic signal, e.g., cyrstal oscillator. The astable multi-vibrator defined as timing control 14 will produce an output signal on line 36 which will alternate between the selected high and low signal levels utilizing the optimum duty cycle pertinent to visual operation of the directional signals 16. In a form of the present invention, the output of the astable multivibrator appearing on line 36 will typically have a duty cycle whereby the output thereof will be in a low state for one-third of the duty cycle and in the high state for two-thirds thereof, the period being one of choice. The output of timing control 14 is input to amplifier Q1. If latching memory unit 31 has been activated indicating a left turn or lane change, the output of Q1 will invert the timing control signal levels output on line 36 and drive power amplifier Q3 to energize left directional signal L. As can be seen from trace (c) of FIG. 4, output 37 of memory latching unit 31 will be in a low signal state when a left turn or lane change is to be indicated. The output of amplifier Q1, through diode CR3, will cause the alternating signal to be applied to left directional signal L causing same to flash at the duty cycle established by timing control 14. Since diode CR3 will isolate the signal input to amplifier Q3 from that input to Q2, right directional signal R will not operate. In a like manner, when the output 38 of latching memory unit 33 is in a low state as a result of its selection by the operator, amplifier Q2 will be energized causing right directional signal R to flash at the duty cycle established by the astable multivibrator comprising timing control 14. As in the prior case, diode CR2 will isolate the signal applied to amplifier Q2 from the input of amplifier Q3. The latching memory units 31 and 33 can be any one of a number of conventional bistable memory units, either solid state or electromagnetic, whereby the output thereof can be made responsive to an input triggering signal. In a preferred form of the present invention, the components designated by latching memory units 31 and 33 as well as memory elements 34 and 35 comprising the astable multivibrator can be incorporated on a single commercially available component marketed by Signetics as its Model No. NE558N.

As discussed hereinabove, the operator of the motor driven cycle will initiate the storage of information in either latching memory unit 31 or latching memory unit 33 to designate a left or right lane change or turn. As stated, an erroneous selection can be reset by contact C. In addition, if a memory unit 31 or 32 had been previously selected by switch control 12 and a new, but opposite direction selected, a pulse of short duration is output on line 45 by capacitors C8 or C9 which will be applied at reset inputs 41 and 42 and thereby reset the previously selected memory unit 31 or 33. The pulse appearing on line 45 will not be applied to the set inputs 30 or 32 because of time constant created by R3 and C2, and R5 and C3 respectively. The manually selected signal that remains will be integrated by R3 and C2, or R5 and C3 respectively, the processed signal activating the appropriate input 30 or 32. C8 and C9 are discharged by R16, R17 and 42 when the directional switch has returned to its off position. The combination of the stored information along with the output of the astable multivibrator comprising timing control 14 will initiate the flashing of one of the directional lights 16. The essential objective of the present invention is proper termination of the directional signal.

Referring again to trace (a) of FIG. 4, the direction of the vehicle is ultimately to be a right turn. As stated hereinabove, operation of a two-wheeled cycle will generally require a counterturn such as that shown intermediate time $t_0$ and $t_1$. As stated hereinabove, the force vector created by the lateral movement of the cycle will cause a component of acceleration which will cause closure of one of the mercury switches which forms a part of sensor assembly 10. As shown in FIG. 2, the lateral movement of the cycle to the left in preparation for the right turn will cause mercury mass 20c to create electrical continuity between contacts 20a and 20b. Mercury switches 20 and 21 are desensitized to small lateral movements as a result of the discrete angle between the central axis of the switches 20 and 21 and a horizontal plane. As can be seen in trace (d) of FIG. 4, the minor closure of mercury switch 20 between times $t_0$ and $t_1$ will result in a "high" signal level indicating a closed contact. As stated previously, the output of mercury switches 20 and 21 are connected in parallel so that the output of both switches, as processed by integrator network 11, will appear on line 22 (FIG. 3). Resistors R2 and R4 along with capacitor C1 comprise integrator network 11 which sorts real turns and lane changes from false movements and processes the information to reset memory units 31 or 33. The application of the integrated switching signal on reset input 41 of latching memory unit 31 and reset input 42 of latching memory unit 33 will comprise a pulse whose characteristics are based upon integrator network 11. As can be seen in trace (e) of FIG. 4, the pulse will terminate at time $t_1$ when the premature switch closure returns to the normally open condition. At time $t_2$, the lateral movement of the motor driven cycle to the right will cause mercury switch 21 to close. As can be seen from traces (d) and (e) of FIG. 4, the signals applied to the reset inputs 41 and 42 of latching memory units 31 and 33 respectively will cause latching memory unit 33 to be reset at $t_4$ [trace (c) of FIG. 4] when the triggering requirement of the latch being used are met. A conventional solid state latching unit is utilized and requires triggering in the form of an input signal which rises above a predetermined level and then falls below a second predetermined level which will then initiate the reset function. In the preferred form of the present invention, the electrical signal appearing on reset inputs 41 or 42 must exceed 1.5 volts DC and then fall below the predetermined lower voltage level in order to reset the memory element. In the form of the present invention shown in FIG. 3, the signals on reset inputs 41 and 42 will reach a level of at least 1.6 volts DC at time $t_3$ and fall below 1.4 volts at time $t_4$. Since trace (a) of FIG. 4 indicates a right turn, latching memory unit 33 will be reset shutting off power amplifier Q2 and halting the flashing of the right directional signal. In the preferred form of the present invention, the components shown in FIG. 3 have the following representative values:

| COMPONENT VALUES | | |
|---|---|---|
| R1 = 3.3K ohms | R10 = 10.0K ohms | CR1-4 = 1N658 |
| R2 = 24.0K ohms | R11 = 10.0K ohms | Q1 = 2N3702 |
| R3 = 100K ohms | R12 = 1.0K ohms | Q2, Q3 = TIP 125 |
| R4 = 3.3K ohms | R13 = 1.0K ohms | |
| R5 = 100K ohms | R14 = 2.2K ohms | |
| R6 = 0.22M ohms | R15 = 2.2K ohms | |
| R7 = 10.0K ohms | R16 = 1.0K ohms | |
| R8 = 10.0K ohms | R17 = 100K ohms | |
| R9 = 0.43M ohms | | |
| C1 = 8µ farads | C6 = 1µ farard | |
| C2 = 1µ farad | C7 = 10µ farads | |
| C3 = 1µ farad | C8 = .001µ farads | |
| C4 = 1µ farad | C9 = .001µ farads | |
| C5 = .001µ farards | | |

It can therefore be seen that the present invention utilizes linear motion accelerometers to monitor the dynamics of a motor driven cycle in order to terminate directional turn signals in response thereto. The sensor assembly used to detect true lane changes and turns will respond only to actual turning movements and is capable of filtering out any extraneous information which would arise from inadvertent movement of the cycle or the instinctive counter movements inherent in the operation of a motor driven cycle. By monitoring the dynamics of the motor driven cycle, the present invention provides a safe and economical manner to implement directional signals on motor driven cycles without dependency on the inflexible parameters of time and distance.

We claim:
1. A vehicle turn detection apparatus for use with a vehicle having directional signals comprising:
   (a) a manual directional turn switch control having at least first and second switch positions;
   (b) linear motion acceleration sensor means for detecting lateral movement of the vehicles, said linear motion acceleration detection means being mounted upon the vehicle;
   (c) first and second memory storage elements having set and reset signal inputs, each having an output which comprises a signal responsive to the first or second position respectively of the manual directional turn switch control, the set input of said first and second memory storage elements being coupled to the first and second positions respectively of the manual directional turn switch control;
   (d) integrator means for processing the value of an electrical signal, said integrator means connected intermediate said linear motion acceleration sensor means and the reset inputs of said first and second memory storage elements;
   (e) timing control means for outputting an electrical signal which alternates between a high and low signal level; and
   (f) first and second means for combining the output signals of said first and second memory storage elements respectively with the output electrical signal of said timing control means, said first and second means being connected to the directional signals.

2. A vehicle turn detection apparatus as defined in claim 1 wherein said linear motion acceleration sensor means comprises first and second mercury switches, each of said switches having a pair of normally open contacts and a mercury mass for closure of same, each of said first and second mercury switches having a central axis which defines the relative movement between the mercury mass and said contacts, the contacts of said first and second mercury switches being electrically connected in parallel to each other, said mercury switches being secured to the vehicle, the central axis of each being perpendicular to the path of travel of the vehicle whereby a lateral rate of change of velocity of the vehicle is sensed.

3. A vehicle turn detection apparatus as defined in claim 2 wherein the central axis of each of said first and second mercury switches is equally and oppositely deflected from a horizontal plane at a predetermined angle.

4. A vehicle turn detection apparatus as defined in claim 3 wherein said angle is in the range of 0°–15°.

5. A vehicle turn detection apparatus as defined in claim 1 wherein said timing control means comprises an astable multivibrator having a duty cycle which periodically alternates the high and low states of the output electrical signal.

6. A vehicle turn detection apparatus as defined in claim 5 wherein said first and second means for combining comprises first and second diodes each having an anode and cathode, the anode of each of said diodes being coupled to the output of said astable multivibrator, the cathode of said first diode being connected to the output of said first memory storage element, the cathode of said second diode being connected to the output of said second memory storage element.

7. A vehicle turn detection apparatus as defined in claim 1 wherein said manual directional turn switch control includes a momentary switch having left, right and clear contacts, and clearing means for resetting one of said first or second memory storage elements, said clearing means being connected intermediate the left and right momentary switch contacts and the reset signal inputs of said first and second memory storage elements respectively.

8. A motorcycle turn detection apparatus for use with a motorcycle having right and left directional signals comprising:
   (a) a manual directional turn switch control having at least first and second switch positions;
   (b) right and left linear motion acceleration sensors comprising a pair of mercury switches, each of said switches having a pair of normally open contacts and a mercury mass for closure of same, each of said first and second mercury switches having a central axis which defines the releative movement between the mercury mass and said contacts, said contacts of said mercury switches being connected in parallel to each other, said mercury switches being secured to the motorcycle, the central axis of each being perpendicular to the path of travel of the motorcycle and being equally and oppositely deflected at a predetermined angle from a horizontal plane whereby a lateral rate of change of velocity of the motorcycle is detected;
   (c) first and second bistable memory units having set and reset signal inputs, each of said bistable memory units having an output which comprises an electrical signal responsive to one of the switch positions of the manual directional turn switch control, each of the set inputs of said first and second bistable memory units being connected to one of the switch positions of said manual directional turn switch control;

(d) integrator means for processing the value of an electrical signal, said integrator means connected intermediate the connected contacts of said mercury switches and the reset inputs of said bistable memory units;

(e) an astable multivibrator having an output electrical signal which periodically alternates between high and low electrical states; and (f) first and second means for combining the output signals of said first and second bistable memory units respectively with the output electrical signal of said astable multivibrator, said first and second means being connected to the right and left directional signals of the motorcycle.

9. A vehicle turn detection apparatus as defined in claim 8 wherein central axis of each of said first and second mercury switches is deflected at an angel from a horizontal plane in the range of 0°–15°.

10. A vehicle turn detection apparatus as defined in claim 8 wherein said first and second means for combining comprises first and second current valves each having an anode and cathode, the anode of each being coupled to the output of said astable multivibrator, the cathode of said first current valve being connected to the output of said first bistable memory unit, the cathode of said second current valve being connected to the output of said second bistable memory unit.

11. A vehicle turn detection apparatus as defined in claim 8 wherein said manual directional turn switch control includes a momentary switch having left, right and clear controls, and clearing means for resetting one of said first and second bistable memory units, said clearing means being connected intermediate the left and right momentary switch contacts and the reset signal inputs of said first and second bistable memory units respectively.

* * * * *